United States Patent [19]

Bailey et al.

[11] Patent Number: 4,848,147

[45] Date of Patent: Jul. 18, 1989

[54] THERMAL TRANSIENT ANEMOMETER

[76] Inventors: James L. Bailey, 829 S. Bruner, Hinsdale, Ill. 60521; Josip Vresk, 4013 N. Park, Westmont, Ill. 60559

[21] Appl. No.: 72,104

[22] Filed: Jul. 10, 1987

[51] Int. Cl.[4] ............................................. G01F 1/68
[52] U.S. Cl. ............................. 73/204.17; 73/204.24
[58] Field of Search ................. 73/204, 204.17, 204.24

[56] References Cited

U.S. PATENT DOCUMENTS

| | | | |
|---|---|---|---|
| 1,766,149 | 6/1930 | Sawyer | 73/204 |
| 1,996,943 | 4/1935 | Wile | 73/204 |
| 2,924,972 | 2/1960 | Biermann | 73/204 |
| 3,030,806 | 4/1962 | Davis | 73/204 |
| 3,498,128 | 3/1970 | Calvet | 73/204 |
| 4,016,758 | 4/1977 | Taylor | 73/204 |
| 4,501,145 | 2/1985 | Boegli | 73/204 |

FOREIGN PATENT DOCUMENTS

| | | | |
|---|---|---|---|
| 601298 | 5/1948 | United Kingdom | 73/204 |
| 1246670 | 9/1971 | United Kingdom | 73/204.17 |

Primary Examiner—Herbert Goldsten
Attorney, Agent, or Firm—Charles F. Lind

[57] ABSTRACT

A thermal transient anemometer having a thermocouple probe which is utilized to measure the change in temperature over a period of time to provide a measure of fluid flow velocity. The thermocouple probe is located in the fluid flow path and pulsed to heat or cool the probe. The cooling of the heated probe or the heating of the cooled probe from the fluid flow over a period of time is measured to determine the fluid flow velocity. The probe is desired to be locally heated near the tip to increase the efficiency of devices incorporating the probe.

30 Claims, 4 Drawing Sheets

THERMAL TRANSIENT ANEMOMETER

The government has rights in this invention pursuant to Contract No. W-31-109-ENG-38 awarded by the U.S. Department of Energy.

BACKGROUND OF THE INVENTION

This invention relates generally to a method and apparatus for measuring fluid flow and more particularly to a thermal anemometer for measuring the local fluid flow over a thermocouple sensor probe.

Fluid velocity measuring devices are well known and typically utilize thermal anemometer probes inserted into a fluid flow stream. The devices apply a variety of electrical heating and thermal sensing principles, such as electrical resistance heating and sensing or Petier heating and/or cooling with Seebeck effect sensing. The heating or thermal sensing can be effected in a steady state, continuous or cyclic manner.

More specifically cyclic or pulsed anemometers utilize either electric resistance for pulsed heating and dynamic temperature sensing as described in U.S. Pat. Nos. 3,719,083, 3,587,318, 3,905.230, 3,498,128, 4,501,145, or Peltier heating and/or cooling described in U.S. Pat. No. 3,030,806, or Seebeck effect temperature sensing as described in U.S. Pat. Nos. 3,030,806, 3,564,916.

The prior methodology, whether pulsed or constant, generally utilizes fixed probe reference points, such as applying continuous power to the probe and measuring the resistance change due to the cooling from the fluid flow stream. The probe can also be utilized to measure the power necessary to maintain a constant resistance in the fluid flow stream. The devices typically require multiple, complex and fragile sensing elements combined with specialized and dedicated electronic circuitry to perform the measurements.

For example, devices that utilize Seebeck effect temperature sensing generally utilize a tungsten wire probe with a thermocouple connected to it. The wire is utilized as a probe in the fluid flow and can oxidize or deform which changes the characteristics of the probe. The prior methodology requires the characteristics of the probe to be unchanged and hence is very sensitive to changes in the probe caused by oxidation or deformation. This generally eliminates utilization in high temperature or corrosive fluid flow streams.

It would be desirable to measure fluid flow velocity with a simple, durable probe, substantially independent of the probe characteristics in any type of fluid flow stream with a methodology which also can be utilized substantially independent of specialized and dedicated electronic circuitry.

SUMMARY OF THE INVENTION

The above and other disadvantages of prior art fluid flow measuring devices and techniques are overcome in accordance with the present invention by measuring the change in temperature over a period of time with a thermocouple probe. The thermocouple sensor probe is located in the fluid flow path and pulsed to heat or cool the probe and then the cooling of the heated or heating of the cooled probe from the fluid flow is measured to provide a measure of the fluid flow velocity. The thermocouple probe and measuring technique can be utilized with any type of fluid flow, such as air, gas and liquid flow streams including corrosive and high temperature fluids. The probes can be sheathed to protect the thermocouple junction or can be unsheathed for low fluid flow rates and/or high sensitivity measurements.

DESCRIPTION OF THE PREFERRED EMBODIMENTS

Figure 1:
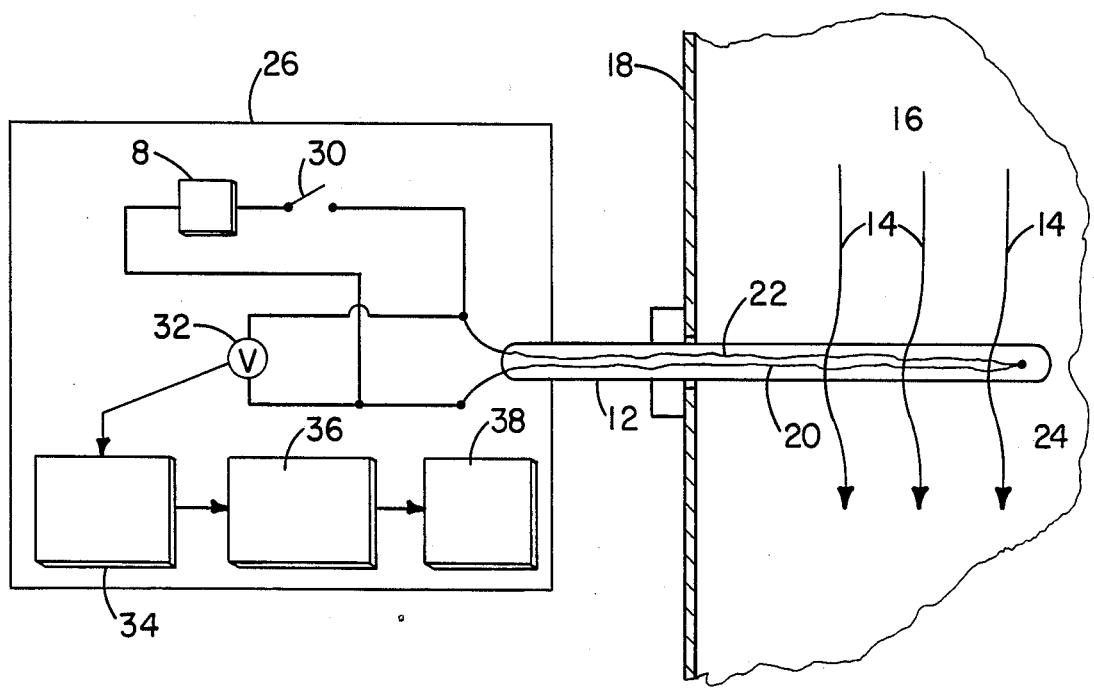
FIG. 1 is a partial schematic and partial block diagram of one embodiment of the thermal anemometer of the invention.

Referring to FIG. 1, one embodiment of a thermal transient anemometer fluid flow measuring device embodying the invention is designated generally by the reference numeral 10. The device 10 includes a thermocouple sensing probe 12 which can be inserted into a fluid flow path, illustrated by arrows 14 to measure the flow velocity.

The fluid flow 14 can be contained in a conduit or duct 16 having one wall 18 thereof illustrated. The thermocouple probe 12 includes a pair of calibration wires 20, 22 which are connected to form a conventional thermocouple junction 24 located adjacent the end of the probe 12.

In this embodiment, the thermocouple 12 is illustrated as being a sheath type probe, specific examples of which are illustrated in FIGS. 6–10. An unsheathed probe also could be utilized such as illustrated in FIG. 11. The sheath protects the junction 24 from the effects of the fluid flow 14.

The device 10 can be permanently mounted in the wall 18 or can be a portable type unit insertable into the duct 16 when desired. A simple, preferably electronic, control unit 26 is illustrated in block form. The unit 26 includes a power supply 28 which is coupled to one of the wires 22 through a pulsing switch 30.

The unit includes a voltage measuring instrument 32, which is coupled to a voltage versus time recorder 34. The voltage and time measurements are coupled to a calculation unit 36, which correlates the fluid flow velocity from the temperature decay or time constant of the probe 12. The calculation unit 36 is coupled to an output or display unit 38, which can generate a visual and/or hard copy output.

Figure 2:
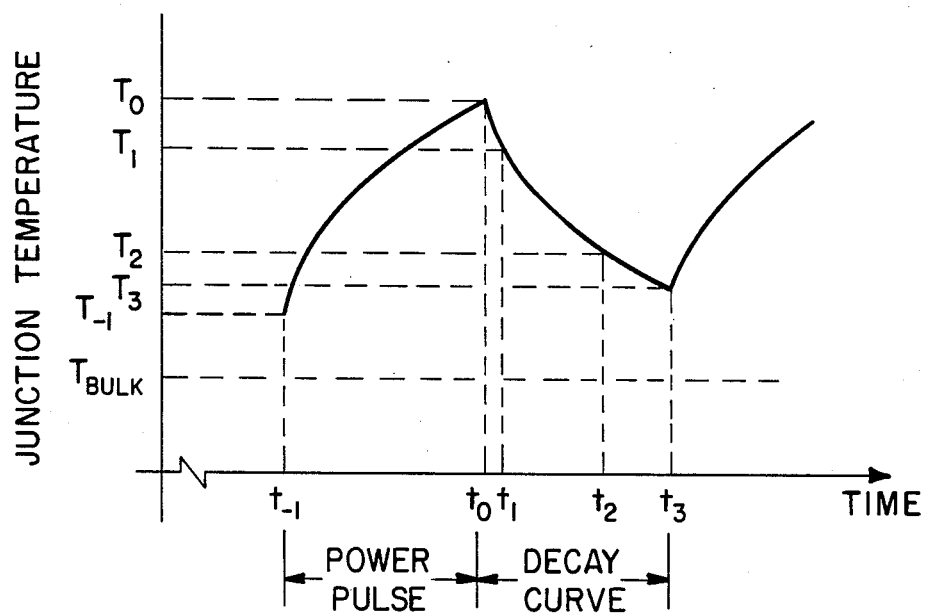
FIG. 2 is a graph illustrating the cyclic operation of the probe in accordance with the invention.

The cyclic operation of the device 10 and the probe 12 is best illustrated with respect to FIG. 2. At a time $t_{-1}$, the pulse switch 30 is closed, coupling a relatively high voltage pulse across the wires 20 and 22 for a time period of $(t_0 - t_{-1})$. The temperature of the probe 12 near the junction 24 is raised by resistance heating to a temperature above that of the fluid to be measured. For example, in typical air flow measurements, the temperature of the probe can be raised 5 to 10° F. above that of the air. As described hereinafter, the power pulse does not require accurate control or measurement.

At time $t_0$, the switch 30 is opened to remove the power from the wires 20, 22. When the power is removed, the temperature distribution in the thermocouple 12 begins to relax. At time $t_1$, the temperature $T_1$ of the junction 24 is measured by the instrument 32 which couples the measurement to the recorder 34. At a second time $t_2$, the temperature $T_2$ of the junction 24 again is measured by the instrument 32 and again is coupled to the recorder 34.

The two measurements, $T_1$ and $T_2$, then are utilized in the unit 36 to calculate the corresponding flow velocity of the flow 14 in accordance with the analysis provided hereinafter with respect to FIGS. 3 and 4. At time $t_3$, the cycle again can be repeated if desired. The temperatures $T_1$ and $T_3$ are totally unrelated and do not need to be the same value. A second conventional reference thermocouple junction may be required where the fluid bulk temperature is not substantially constant.

Figure 3:
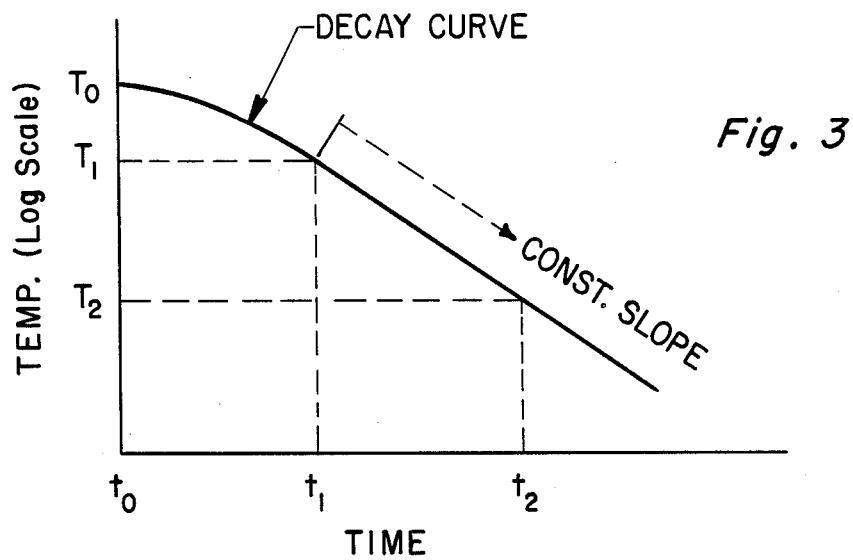
FIG. 3 is a graph of the characteristic temperature decay of a thermocouple probe in accordance with the invention.

A mathematical analysis of the temperature decay of the junction 24 is charactered by the graph illustrated in FIG. 3. Initially, at time $t_0$, the junction 24 has some arbitrary temperature profile described by a temperature function, f(r). Modeling the probe 12 as an infinitely long, homogeneous solid cylinder, the temperature distribution as functions of radius 'r' and time 't' can be described by the classical series solution of equation 1. This discussion is made under the zero reference theory, where the fluid temperature is assumed to be zero, so that the probe temperature "T" actually represents a difference from the reference temperature. In actual practice, the fluid temperature would be measured and known, so that the corresponding measured difference between the fluid and probe temperatures could easily be correlated mathmatically.

$$T = \frac{2}{a^2} \sum_{n=1}^{\infty} e^{-k\alpha_n^2 t} \left[ \frac{\alpha_n^2 J_o(\alpha_n r)}{(h^2 + \alpha_n^2) J_o^2(\alpha_n a)} \right] \int_0^a rf(r) J_o(\alpha_n r) dr \quad \text{(Eq. 1)}$$

Where:
T = temperature differential between probes and fluid at given radius and time
r = radius
a = outside radius of cylinder
t = time
H = convective coefficient at cylinder surface
h = H/K
k = K/ρC
ρ = density
c = heat capacity
K = thermal conductivity within the cylinder
Jo = Bessel function of order zero
$\alpha_n$ = roots of the transcendental equation 2

$$\alpha J'_o(a\alpha) + h J_o(a\alpha) = 0 \quad \text{(Eq. 2)}$$

After a sufficient decay time, $t_0 - t_1$, the initial temperature conditions in the probe 12 relaxes and all terms, in the same series, approach zero, accept one. Applicants have determine that the decay equation after time, $t_1$, can be approximated by:

$$T = A_1 e^{-k\alpha_1^2 t} \quad \text{(Eq. 3)}$$

where $$A_1 = \frac{2\alpha_1^2}{a^2} \frac{J_o(\alpha_1 r_o)}{(h^2 + \alpha_1^2) J_o^2(\alpha_1, a)} \int_0^a rf(r) J_o(\alpha_1 r) dr$$

$A_1$ is a constant for fixed initial conditions, flow conditions and radial position, r; and $\alpha_1$, is the smallest root (eigenvalue) of the transcendental equation 2.

Figure 4:
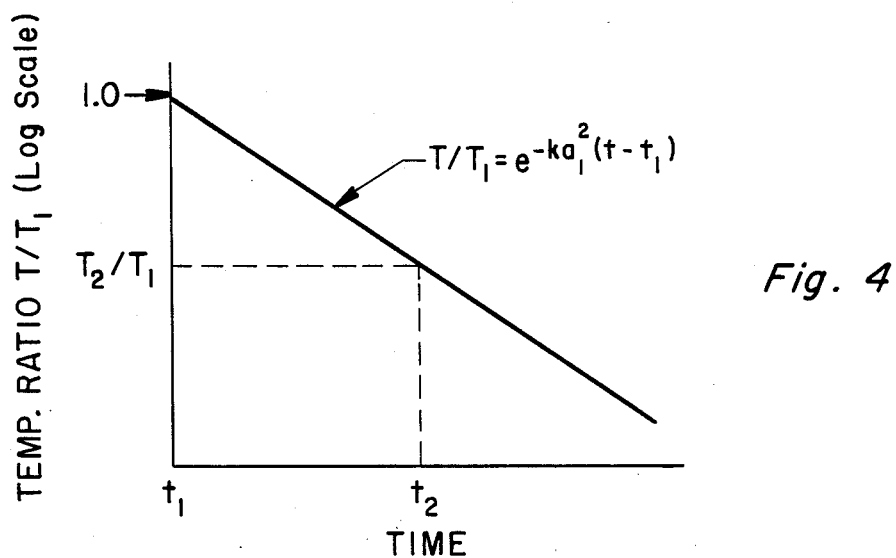
FIG. 4 is a semi-log plot of the normalized temperature decay of a thermocouple probe in accordance with the invention.

A semi-log plot of equation 3 starting at time, $t_1$, and normalize to $T_1$, is shown in FIG. 4. The slope of this curve is constant and approximated by equation 4. Significantly, the initial conditions cancel and, therefore, the slope is independent of the power pulse's shape, duration, radial position and magnitude. Utilizing equation 4 and from equation 2 recognizing that H is a function of $\alpha_1$, the convective coefficient, H, can be determined by using equation 4A.

$$\frac{\ln T_2/T_1}{t_2 - t_1} = -k\alpha_1^2 = \text{Slope} \quad \text{(Eq. 4)}$$

or $$\alpha_1 = \sqrt{-\rho \frac{c}{K} \times \text{slope}} \quad \text{(Eq. 4A)}$$

From fluid dynamic considerations, the convective coefficient at the surface of the probe can be approximated using a correlation for fluid cross flow over a cylinder in the form of equation 5.

$$H = CRe^n \quad \text{(Eq. 5)}$$

Where $$Re = vd/\gamma \text{ (Reynolds Number)} \quad \text{(Eq. 5A)}$$

d = outside diameter of cylinder
v = local fluid velocity
γ = dynamic viscosity and C and n are known empirical constants over large ranges of Re numbers. Substituting equation 5A into equation 5 yields equation 6.

$$v = \frac{\gamma}{d} \left( \frac{H}{C} \right)^{1/n} \quad \text{(Eq. 6)}$$

Thus, with measured temperature values, $T_1$ and $T_2$, the local flow velocity, v, can be calculated using equations 2, 4A and 6.

For small internal thermal resistances (Biot # = hd < 1) local fluid velocity is approximately related to the slope in equation 4 utilizing equation 7. Hence, for fixed fluid and probe properties, a log-log plot of v vs. slope, results in a straight line with slope n.

$$v^n = \text{Slope} \times \text{Constant} \quad \text{For Biot \# < 1} \quad \text{(Eq. 7)}$$

The above constant is a calibration constant dependent upon fixed probe and fluid properties. A database for different fluids and/or fluid temperatures can then be developed. The exponent 'n' is a known constant over large ranges of Re numbers and is given as 0.466 for the range of Re numbers from 40 to 4,000.

Thus, with measured normalized slope values (from equation 4) the local flow velocity, v, can be calculated using equation 7. The total flow in the duct 16 based upon the local velocity reading or readings then can be calculated utilizing fluid conditions, duct size, probe location, etc. as utilized in many conventional flow measurement methods.

Figure 5:
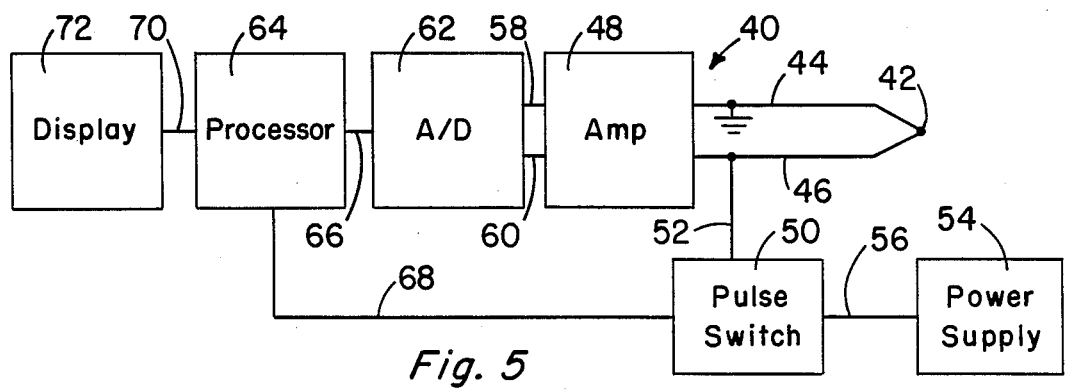
FIG. 5 is a block diagram of one logic circuit embodiment of the invention.

A generalized block and schematic logic circuit of another embodiment of the anemometer of the invention is designated generally by the reference numeral 40 in FIG. 5. A thermocouple junction 42 is coupled by a pair of calibration wires 44 and 46 to an amplifier 48. The wire 44 conveniently can be grounded and the wire 46 is coupled to a pulse switch 50 via a line 52. The pulse switch 50 is coupled to a power supply 54 via a line 56.

The amplifier 48 is coupled via wires 58 and 60 to an analog-to-digital converter (A/D) 62. The output of the A/D converter 62 is coupled to a processor 64 via a line 66. The processor 64, such as a microcomputer or microprocessor, also is coupled via a line 68 to the switch 50 and via a line 70 to a display 72. Although not illustrated, appropriate filtering can be provided at the input to the amplifier 48 to isolate the amplifier 48 from the transient power pulses applied to the junction 42, if desired.

In the device 40, the process 64 control the timing of the pulses applied to the junction 42 by the pulse switch 50 and the power supply 54. The voltage from the junction 42 is amplified by the amplifier 48 and converted into digital signals to be utilized by the digital process which then can be displayed in the display 72. Although digital signals are most preferable along with the utilization of a microprocessor for the processor 64, an analog logic processor also could be utilized in which case the processor 64 and associated circuitry could be eliminated.

The devices 10 and 40 have good stability, repeatability and sensitivity. The devices 10 and 40 readily can be adapted for simultaneous multiple flow measurement techniques. Thermocouples have an established history of reliability, accuracy and durability and the devices 10 and 40 benefit from the incorporation of the thermocouple concept. Specific thermocouple designs are illustrated in FIGS. 6-11.

In conventional thermocouples, the entire thermocouple length is heated by applying sufficient power thereto. A decrease in power consumption can be obtained by heating only the tip area of the thermocouple around the thermocouple junction. The following probes described especially in FIGS. 6-10 are designed to utilize standard fabrication techniques to minimize manufacturing costs. The utilization of sheath type thermocouples allows their established history of reliability, accuracy and durability to be incorporated into the devices 10 and 40. Further, the thermocouples are modified to minimize the power requirements for decreasing operating costs and to enhance portable battery powered applications.

Figure 6:
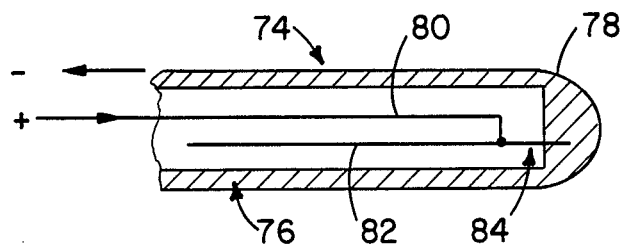
FIGS. 6–10 are embodiment of sheath type probe incorporating the invention.

Referring to FIG. 6, a first embodiment of a sheath type thermocouple probe 74 is best illustrated. The probe 74 includes a sheath outer body 76 ending in a closed tip 78. A first calibration wire 80 is formed to have a relatively low electrical resistance by forming the wire 80 from a highly conductive material and/or a large wire diameter. A second calibration wire 82 is formed to have a relatively high electrical resistance by forming the wire 82 from a poor conductive material and/or a small wire diameter.

A junction 84 is formed adjacent the tip 78 and the wire 82 is grounded to the tip 78 and hence the sheath body 76. The tip 78 is locally heated adjacent the junction 84. The local heating of the tip 78 is accomplished by applying a relatively high voltage across the low resistance wire 80 and the sheath body 76. The current thus flows through the wire 80 to the junction 84 with negligible resistance heating. From the junction 84, the current flows through the high resistance wire 82 to the grounded tip 78. The wire 82 is thus heated between the junction 84 and the tip 78 to locally heat the tip 78. The current flow through the sheath body 76 generates a minimal or negligible resistance heating. The temperature sensing of the probe 74 is performed by utilizing the Seebeck effect between the wires 80 and 82 at the junction 84.

Figure 7:
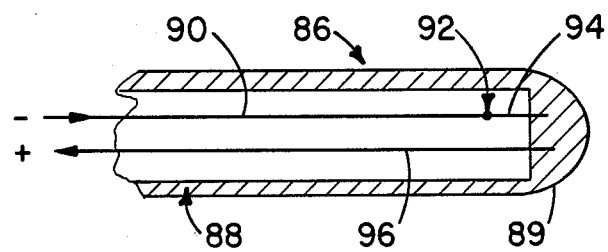

A second embodiment of a sheath type thermocouple probe 86 is illustrated in FIG. 7. The probe 86 includes a sheath body 88 with a tip 89. A first low resistance calibration wire 90 is connected at a junction 92, just prior to the tip 89, to a high resistance wire portion 94 which is grounded to the tip 89. A second low resistance calibration wire 96 is also grounded to the tip 89.

The local heating of the tip 89 during the applied power pulse is accomplished by applying a relatively high voltage across the wires 90 and 96. Due to the high electrical conductivity of the wires 90 and 96, the only significant resistance heating occurs in the high resistance wire portion 94 adjacent the tip 89. The temperature sensing of the probe 86 is accomplished by utilizing the Seebeck effect between the wires 90 and 96. The wire 96 also can be eliminated and the voltage then can be applied across the wire 90 and the sheath body 88.

Figure 8:
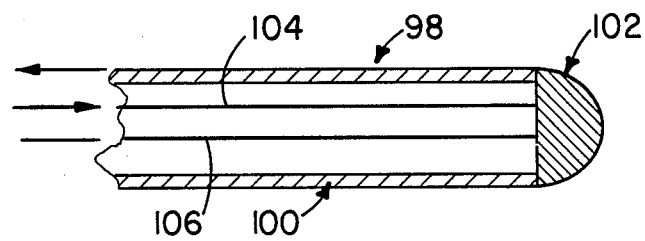

A third sheath type thermocouple probe embodiment is designated generally by the numeral 98 in FIG. 8. The probe 98 also has a low resistance sheath body 100, however, the probe 98 has a tip 102 formed from a high electrical resistance material. A pair of low resistance calibration wires 104 and 106 are grounded to the tip 102. The tip 102 is locally heated by applying a relatively high voltage across the wires 104 and 106 which are of high conductivity causing the only significant resistance heating to occur in the tip 102. Temperature sensing is again accomplished by utilizing the Seebeck effect between the wires 104 and 106. Alternatively the voltage can be applied across the sheath body 100 and one of the calibration wires, which eliminate the need for the other calibration wire to be formed of a low resistance wire.

Figure 9:
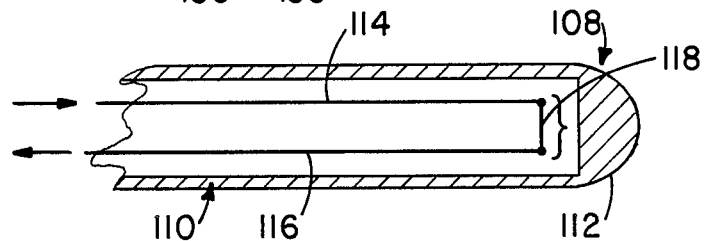

Another sheath type probe embodiment 108 is illustrated in FIG. 9. The probe 108 includes a sheath body 110 having a tip 112. A pair of relatively low resistance wires 114 and 116 are connected adjacent the tip 112 by a portion of high resistance wire 118. The tip 112 is locally heated by applying a relatively high voltage pulse across the pair of wires 114 and 116 which resistance heats the portion 118 to in turn heat the tip 112. Temperature sensing of the probe 108 again is accomplished by utilizing the Seebeck effect between the pair of wires 114 and 116.

Figure 10:
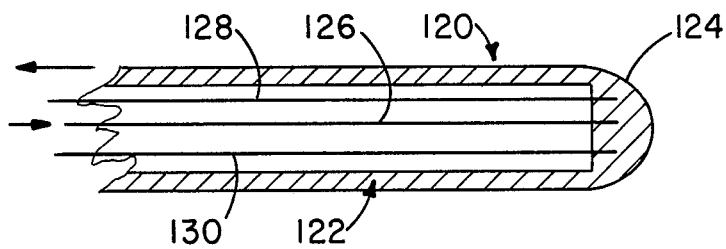
Figure 11:
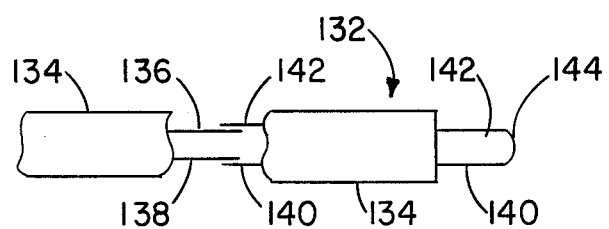
FIG. 11 is an embodiment of a non-sheathed type probe incorporating the invention.

A fifth embodiment of sheath type thermocouple probe 120 is illustrated in FIG. 10. The probe 120 includes a sheath body 122 having a tip 124. A low electrical resistance wire 126 is grounded to the tip 124. To accomplish local heating of the tip 124, either the tip 124 can be a high resistance material such as the tip 102 (FIG. 8) or the wire 126 can include a high resistance portion at the tip such as the wire portion 94 (FIG. 7).

A pair of calibration wires 128 and 130 are utilized for temperature sensing by utilizing the Seebeck effect between the wires 128 and 130.

Alternatively, four or more multi-wire configurations also can be utilized. For example, two wires can be utilized for providing the power pulse and two separate calibration wires can be utilized for the Seebeck effect temperature sensing. Another alternative is leaving the calibration wires 128 and 130 ungrounded in a similar fashion to a conventional ungrounded thermocouple.

As illustrated in FIG. 11, in sensitive or low flow rate or non-corrosive fluid flow conditions, a non-sheath type thermocouple probe embodiment 132 can be utilized. Exposed element thermocouples are well known, for example, Type 4580 and Type 6578C, D or E Air and Gas Probes sold by Alnor Instrument Company, under the trademark "AL-TEMP II". The Type 6578C, D or E probe includes an open, but physically shielded tip.

The probe 132 includes an insulator body 134 in one or more segments, which is broken away to illustrate a pair of thermocouple wires 136 and 138 which generally are welded, such as by lap welding, to a second pair of thermocouple wires 140 and 142. The wires 140 and 142 are welded together at their exposed ends to form a thermocouple junction 144. The junction 144 is exposed to the fluid flow such as in the duct 16 (FIG. 1) where conditions permit. The exposed probe 132 also can be utilized to practice the invention.

Figure 12:
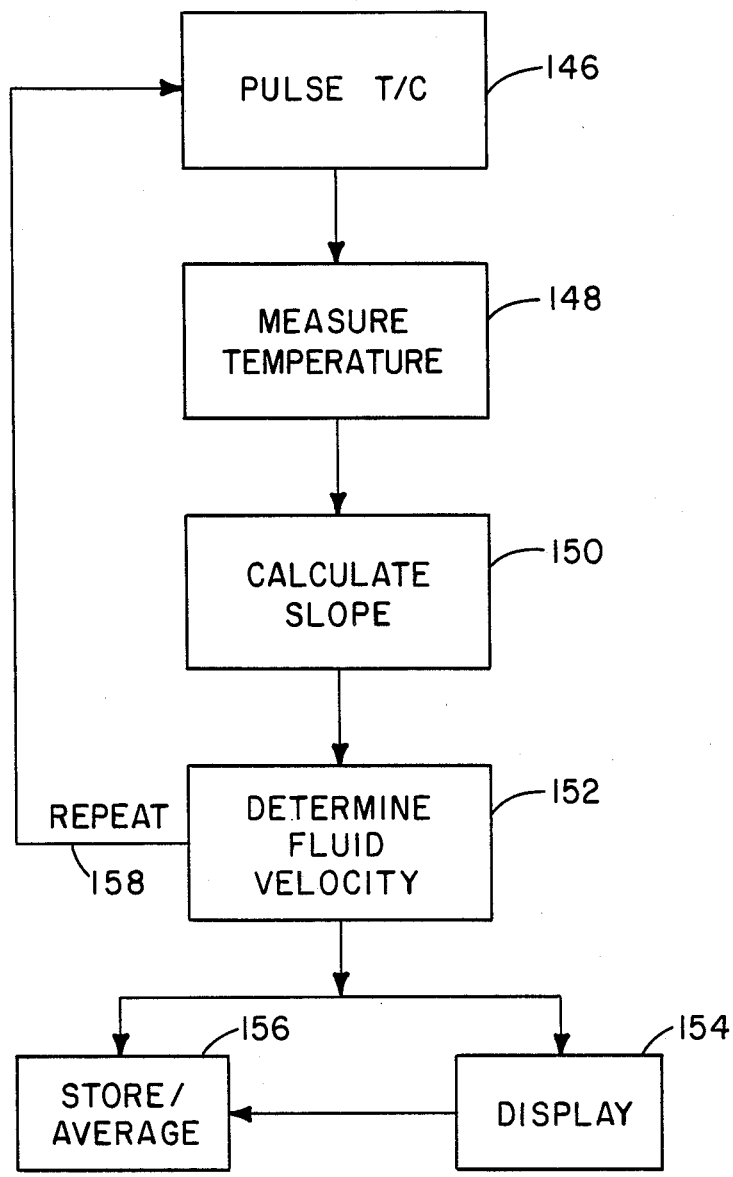
FIG. 12 is a flow chart of the operation of the invention.

A flow diagram of the operation of the flow measuring device 10 is illustrated in FIG. 12. The thermocouple (t/c) 12 is first pulsed as indicated by a block 146 such, as over time period $t_0-t_{-1}$ in FIG. 2. The temperature is then measured, as indicated by a block 148, at least twice, such as at times $t_1$, $t_2$, etc. in FIG. 2, as the junction temperature decays. The slope of the decay curve is then calculated as indicated by a block 150, in accordance with Equation 4. The fluid velocity then is determined from the slope, as indicated by a block 152 in accordance with Equation 7.

The velocity determined from each power pulse set of measurements then can be displayed as indicated by a block 154. Alternatively or in addition, the velocity determined by a power pulse can be stored and averaged with succeeding pulse measurements, as indicated by a block 156. Each velocity value can be displayed, and the average also can be displayed, or only the average velocity need be displayed. The average can be a running average or can be for a fixed time period. After each velocity is determined, the sequence again can be repeated as indicated by a line 158.

Modifications and variations of the present invention are possible in light of the above teachings. The heating of the probes can be effected as described by electrical resistance heating (Joule heating). The heating or cooling of the probes relative the fluid also can be effected by Peltier heating or cooling. The sheath type probes can include a conventional potting material if desired. The calibration wires generally are formed from thermocouple alloys. The addition in some probe embodiments of a separate wire portion or the probe tip between the calibration wires, does not effect the measurement as long as the junctions are maintained substantially at the same temperature. It is therefore to be understood that within the scope of the appended claims, the invention may be practiced otherwise than as specifically described.

What is claimed and desired to be secured by Letters Patent of the United States is:

1. A method of measuring fluid flow velocity, comprising:
   providing a thermocouple probe means for measuring the temperature of a fluid in a fluid flow path;
   inserting said probe means into said fluid flow path and measuring the temperature of said fluid;
   applying at least one power pulse to said probe means to provide arbitrary initial probe conditions and arbitrary temperature differential between said probe means and said fluid;
   delaying for a predetermined period after said power pulse to allow the initial probe conditions to become negligible and measuring the temperature of said probe means a first time,
   measuring the temperature of said probe means at a second time, following said first time; an
   correlating said temperature measurements of the fluid and probe to provide a measure of the fluid flow velocity.

2. The method as defined in claim 1 including providing said temperature differential by heating said probe means.

3. The method as defined in claim 2 including heating said probe means by electrical resistance heating.

4. The method as defined in claim 2 including providing said probe means with a thermocouple junction adjacent a free end or tip of said probe means and only heating a local area of said probe means adjacent said tip.

5. The method as defined in claim 1 including providing said temperature differential by cooling said probe means.

6. The method as defined in claim 5 including cooling said probe means by Peltier cooling.

7. The method as defined in claim 5 including providing said probe means with a thermocouple junction adjacent a free end or tip of said probe means and only cooling a local area of said probe means adjacent said tip.

8. The method as defined in claim 1 including correlating said temperature measurements includes calculating at least one parameter related to the coefficient of thermal exchange and the temperature of said fluid.

9. The method as defined in claim 1 wherein said applied power pulse is formed of an arbitrary magnitude and arbitrary time period.

10. The method as defined in claim 1 including forming said probe means as a sheath type thermocouple probe having a grounded probe tip, a pair of different electrical resistance calibration wires, forming a Seebeck junction adjacent said tip from said pair of wires and connected to said tip by a high electrical resistance wire.

11. The method as defined in claim 1 including forming said probe means as a sheath type thermocouple probe having a probe tip, a pair of calibration wires, a first of said wires grounded to said tip and a second of said wires having a low electrical resistance connected adjacent said tip to a high electrical resistance wire portion forming a Seebeck junction and said wire portion connected to said tip.

12. The method as defined in claim 1 including forming said probe means as a sheath type thermocouple probe having a grounded probe tip formed of high electrical resistance material and a pair of low electrical resistance calibration wires connected to said tip.

13. The method as define in claim 1 including forming said probe means as an ungrounded sheath type thermocouple probe having a tip and a pair of low electrical resistance calibration wires connected adjacent said tip by a third wire of a high electrical resistance.

14. The method as defined in claim 1 including forming said probe means as a grounded sheath type thermocouple probe having a tip formed of high electrical resistance material, a pair of calibration wires and a third wire of low electrical resistance all grounded to said tip.

15. The method as defined in claim 1 including forming said probe means as a grounded sheath type thermocouple probe having a tip, a pair of calibration wires grounded to said tip and a third wire of low electrical resistance connected adjacent said tip by a wire portion of high electrical resistance to form a Seebeck junction and said wire portion connected to said tip.

16. An apparatus for measuring fluid flow velocity, comprising:
thermocouple probe means for measuring the temperature of a fluid in a fluid flow path when said probe means is inserted into said fluid flow path;
means for applying at least one power pulse to said probe means to provide arbitrary probe conditions and an arbitrary temperature differential between said probe means and said fluid;
means for delaying for a predetermined period of time after said power pulse to allow the initial probe conditions to become negligible and, for measuring the temperature of said probe means a first time, and at a second time following said first time; and
means for correlating said temperature measurements of the fluid and the probe to provide a measure of the fluid flow velocity.

17. The apparatus as define in claim 16 including means for heating said probe means to provide said temperature differential.

18. The apparatus as defined in claim 17 wherein said heating means include means for heating said probe means by electrical resistance heating.

19. The apparatus as defined in claim 17 wherein said probe means include a thermocouple junction adjacent a free end or tip of said probe means and said means for heating include means for only heating a local area of said probe means adjacent said tip.

20. The apparatus as defined in claim 16 including means for cooling said probe means to provide said temperature differential.

21. The apparatus as defined in claim 20 wherein said cooling means include means for cooling said probe means by Peltier cooling.

22. The apparatus as defined in claim 20 wherein said probe means include a thermocouple junction adjacent a free end or tip of said probe means and said means for cooling include means for only cooling a local area of said probe means adjacent said tip.

23. The apparatus as defined in claim 16 wherein said correlating means include means for calculating at least one parameter related to the coefficient of thermal exchange and the temperature of said fluid.

24. The apparatus as defined in claim 16 wherein said applied power pulse is formed of arbitrary magnitude and arbitrary time period.

25. The apparatus as defined in claim 16 including said probe means formed as a sheath type thermocouple probe having a grounded probe tip, a pair of different electrical resistance calibration wires, a Seebeck junction formed adjacent said tip from said pair of wires an connected to said tip by a high electrical resistance wire.

26. The apparatus as defined in claim 16 including said probe means formed as a sheath type thermocouple probe having a probe tip, a pair of calibration wires, a first of said wires grounded to said tip and a second of said wires having a low electrical resistance connected adjacent said tip to a high electrical resistance wire portion to form a Seebeck junction and said wire portion connected to said tip.

27. The apparatus as defined in claim 16 including said probe means formed as a sheath type thermocouple probe having a grounded probe tip formed of high electrical resistance material and a pair of low electrical resistance calibration wires connected to said tip.

28. The apparatus as defined in claim 16 including said prob means formed as an ungrounded sheath type thermocouple probe having a tip and a pair of low electrical resistance calibration wires connected adjacent said tip by a third wire of a high electrical resistance.

29. The apparatus as define in claim 16 including said probe means formed as a grounded sheath type thermocouple probe having a tip formed of high electrical resistance material, a pair of calibration wires and a third wire of low electrical resistance all grounded to said tip.

30. The apparatus as defined in claim 16 including said probe means formed as a grounded sheath type thermocouple probe having a tip, a pair of calibration wires grounded to said tip and a third wire of low electrical resistance connected adjacent said tip by a wire portion of high electrical resistance to form a Seebeck junction and said wire portion connected to said tip.

* * * * *